United States Patent
Stoiber (10) Patent No.: US 12,202,211 B2
(45) Date of Patent: Jan. 21, 2025

(54) LEAK RESISTANT JOINT FORMING APPARATUS AND PROCESS

(71) Applicant: BEND ALL AUTOMOTIVE ULC, Ayr (CA)

(72) Inventor: Ernie Stoiber, Kitchener (CA)

(73) Assignee: BEND ALL AUTOMOTIVE ULC, Ontario (CA)

( * ) Notice: Subject to any disclaimer, the term of this patent is extended or adjusted under 35 U.S.C. 154(b) by 0 days.

(21) Appl. No.: 18/563,156

(22) PCT Filed: Dec. 30, 2022

(86) PCT No.: PCT/CA2022/051906
§ 371 (c)(1),
(2) Date: Nov. 21, 2023

(87) PCT Pub. No.: WO2024/138257
PCT Pub. Date: Jul. 4, 2024

(65) Prior Publication Data
US 2024/0326348 A1    Oct. 3, 2024

(51) Int. Cl.
*F16L 25/00* (2006.01)
*B29C 65/00* (2006.01)
*B29C 65/56* (2006.01)
*F16L 33/207* (2006.01)

(52) U.S. Cl.
CPC ........ *B29C 65/565* (2013.01); *B29C 66/5221* (2013.01); *F16L 33/2076* (2013.01)

(58) Field of Classification Search
CPC . B29C 65/565; B29C 66/5221; F16L 33/2076
See application file for complete search history.

(56) References Cited

U.S. PATENT DOCUMENTS

| | | | |
|---|---|---|---|
| 4,369,992 A | 1/1983 | Fournier | |
| 5,096,234 A | 3/1992 | Oetiker | |
| 5,478,121 A | 12/1995 | Foti | |
| 6,485,064 B1 | 11/2002 | Davidson | |
| 8,943,668 B2 * | 2/2015 | Menor | B23P 11/005 |
| | | | 285/256 |
| 10,309,565 B2 | 6/2019 | Radhakrishnan | |

FOREIGN PATENT DOCUMENTS

EP    1936253    6/2008

* cited by examiner

*Primary Examiner* — Ryan J. Walters
(74) *Attorney, Agent, or Firm* — Defillo & Associates, Inc.; Evelyn A. Defillo (57) ABSTRACT

An automatable joint forming apparatus and process for leak resistance assembly of a flexible fluid conduit to a rigid fluid conduit including insertion of the rigid conduit and a sliding shape conforming die.

21 Claims, 6 Drawing Sheets

LEAK RESISTANT JOINT FORMING APPARATUS AND PROCESS

CROSS REFERENCE TO RELATED APPLICATION

This application is a National Stage Entry of PCT/CA2022/051906 filed Dec. 30, 2022, under the International Convention.

FIELD OF THE INVENTION

The field of the invention is the automated leak resistant assembly of rigid to flexible fluid carrying lines such as hydraulic fluid lines one to another by reliable and verifiable insertion.

BACKGROUND OF THE PRIOR ART

Automated assembly of fluid transferring components one to the next has encountered reliability problems which are highly subject to the tolerances of the parts themselves and their relative relationship at the point of assembly by insertion.

Parts tolerances are necessarily larger in less costly quantities and in bulk shipping arrangements.

OBJECTS OF THE INVENTION

It is an object of the invention to provide a joint forming apparatus and process with increased reliability, better evidence of complete connection and which is more fault tolerant in automated situations where tolerances are less than ideal.

Further, it is an object of the invention to provide for increased reliability leak resistant insertion of rigid hydraulic lines into flexible lines in automated processing.

SUMMARY OF INVENTION

The invention provides a tooling system for automated co-axial assembly of a cylindrical flexible fluid conduit having a first inline fluid-transfer nominally cylindrical bore with a corresponding central first fluid conduit axis, a nominally cylindrical first outer surface, and, a first free end, to, the free end of a second cylindrical fluid conduit having a second inline fluid-transfer bore with a corresponding central second fluid conduit axis, and, a nominally cylindrical second outer surface, and the second outer surface including a nominal diameter adapted to engage circumferentially with the first inline fluid-transfer bore, in an overlapping fluid-leak-resisting relationship between the first fluid transfer bore and the second outer surface, including a female die component adapted, when engaged with the outer surface of the first fluid conduit during the assembly process to confine the shape of the outer surface of the first free end within its nominally cylindrical shape, and, to confine the first fluid conduit axis at the first free end to the center of its nominally cylindrical shape and its bore along a substantially straight line, and, to provide a sliding interference fit between the female die component and the first outer surface, and a guiding mechanism adapted, when engaging with and guiding either or both of the first and the second fluid conduits to confine the first and second fluid conduit axes to axial end-to-end alignment with each other, to axially present the free end of the fluid conduits to each other, and, a pressing mechanism adapted both to drive the second outer fluid conduit surface into the first fluid transfer bore, and, to simultaneously drive the female die component away from the first free end along the first fluid conduit axis.

The invention also provides a tooling system wherein the pressing mechanism simultaneously drives the second outer fluid conduit surface within the first fluid transfer bore, and, the female die component away from the first free end along the first fluid conduit axis.

The invention also provides a tooling system wherein the female die component engages the first outer surface spaced from the first free end and drives the first and second fluid conduits into free-end-to-free-end contact and subsequently drives the female die component.

The invention also provides a tooling system wherein the pressing mechanism drives the female die component prior to and following upon free-end-to-free-end contact.

Further, the invention provides a tooling system wherein the second fluid conduit includes an open cylindrical ferrule secured in relation to the second fluid conduit distal from the its free end, having an internal diameter larger than the nominal diameter of the second outer surface, and, adapted to engage the first outer surface wherein the open cylindrical ferrule is adapted to sealingly engage the first outer surface.

Still further, the invention provides a tooling system wherein the pressing mechanism simultaneously drives the second outer fluid conduit surface within the first fluid transfer bore axially with a component of co-rotation about that axis between the first and second fluid conduits.

The invention also provides a tooling system wherein the pressing mechanism includes the ferrule which drives the female die component.

In addition the invention provides a process for automated co-axial assembly of a first cylindrical flexible fluid conduit having a first inline fluid-transfer nominally cylindrical bore with a corresponding central first fluid conduit axis, a nominally cylindrical first outer surface, and, a first free end, to, the free end of a second cylindrical fluid conduit having a second inline fluid-transfer bore with a corresponding central second fluid conduit axis, and, a nominally cylindrical second outer surface, and the second outer surface including a nominal diameter adapted to engage circumferentially with the first inline fluid-transfer bore, in an overlapping fluid-leak-resisting relationship between the first fluid transfer bore and the second outer surface, including engaging the outer surface of the first fluid conduit before and during the assembly process with a female die component to confine the shape of the outer surface of the first free end within its nominally cylindrical shape, and, confining the first fluid conduit axis at the first free end to the center of its nominally cylindrical shape and its bore along a substantially straight line, and, providing a sliding interference fit between the female die component and the first outer surface, and guiding and engaging either or both of the first and the second fluid conduits to confine the first and second fluid conduit axes to axial end-to-end alignment with each other, to axially present the free end of the fluid conduits to each other, and, pressing both the second outer fluid conduit surface into the first fluid transfer bore, and, simultaneously driving the female die component away from the first free end along the first fluid conduit axis.

Still further, the invention provides a pair of fluid conduits, one flexible, the other rigid, combined axially into an overlapping and leak-resisting assembly by the process as set out above.

And further, the invention provides a tooling system, process and product-by-process as described and claimed herein.

PREFERRED EMBODIMENTS

Figure 1:
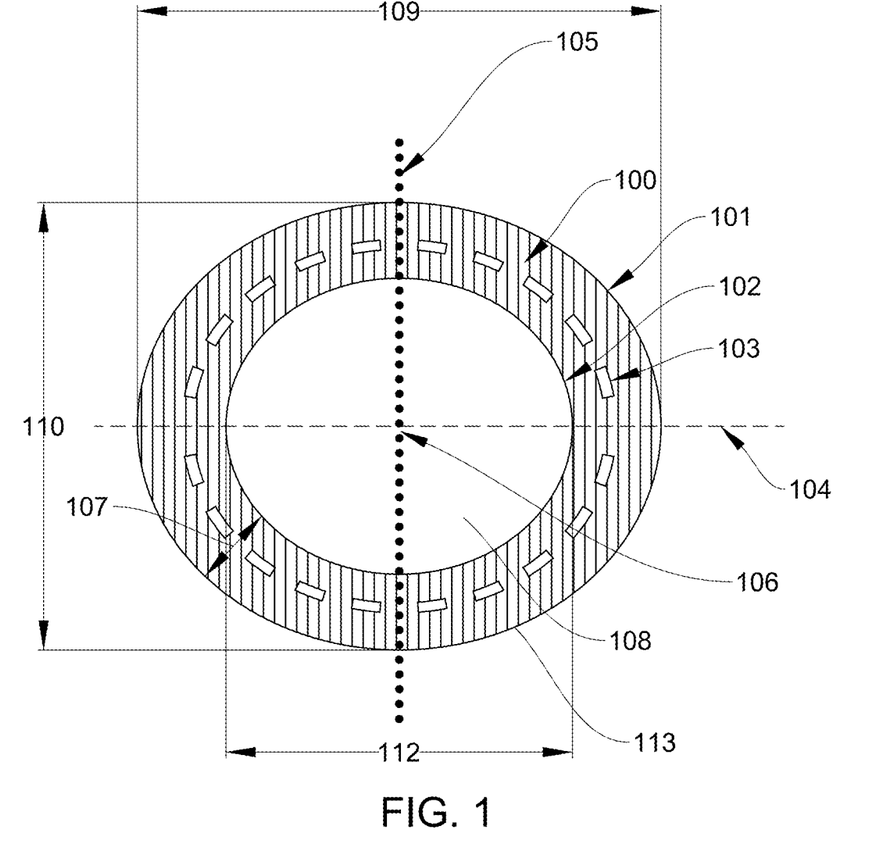
FIG. 1 provides an axial end view of the free end of the flexible fluid conduit in its unassembled state.

As shown in FIG. 1 flexible first fluid conduit 100 arrives to the point of assembly in an initial state which may be far from its nominal circular cylindrical outer shape and central fluid bore. Typically manufacture, shipping and storage of the bulk conduit product which is preferably a reinforced flexible hydraulic line or pressure hose often results in a deformation of the preferably nominal circular sections to an ovoid-like shape having one dimension 110 along a central plane 104 somewhat different from that of the other dimension 109 along another plane 105.

Typically, first conduit 100 has a somewhat flattened cylindrical outer surface 101 and a corresponding somewhat irregular central inner surface 102 about a centrally located axis 106 lying along the intersection of planes 104 and 105. Conduit 100 may be provided with a pressure-resisting braid 103 within its wall. The shape of inner surface 102 may be different at different points along the length of the fluid conduit which may be temporarily or semi-permanently exaggerated by the cutting operation at free end 111.

Nominally conduit 100 provides a central fluid passing bore 108 surrounded by a nominal wall thickness 107 which preferably presents a nominally uniform diameter 112 in its cross-section.

Figure 2:
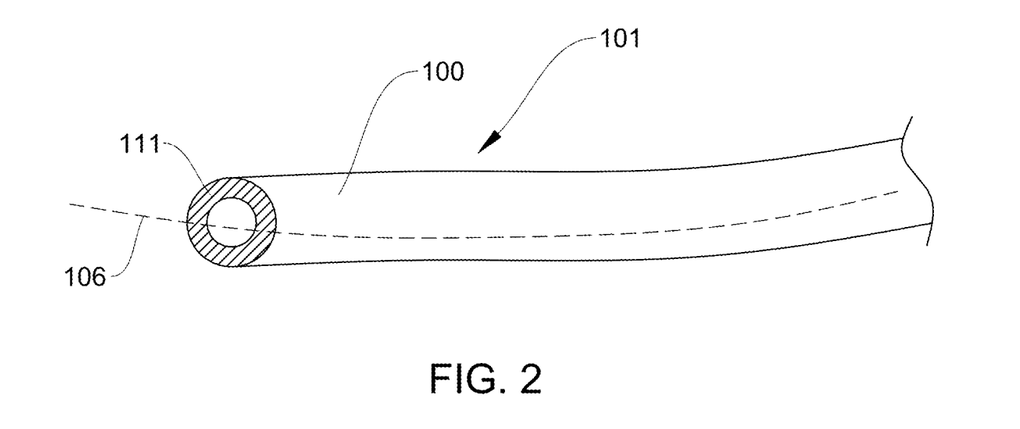
FIG. 2 provides a perspective view of the flexible fluid conduit in its unassembled state.

As shown in FIG. 2 conduit 100 includes its outer surface 101 and its free end 111, in turn adapted for leak-resisting axial assembly by insertion of a connecting second conduit providing a leak-resistant close interference fit 113 from its free end 111 along its inner surface 102 in the direction of its central axis 106.

Again, typically, manufacture, shipping and storage of the bulk flexible conduit 100, such as by a rolled coil, results in axis 106 adopting a semi-permanent curve 109 as shown in FIG. 2 which curve may also be exaggerated by the cutting operation at free end 111.

Figure 3:
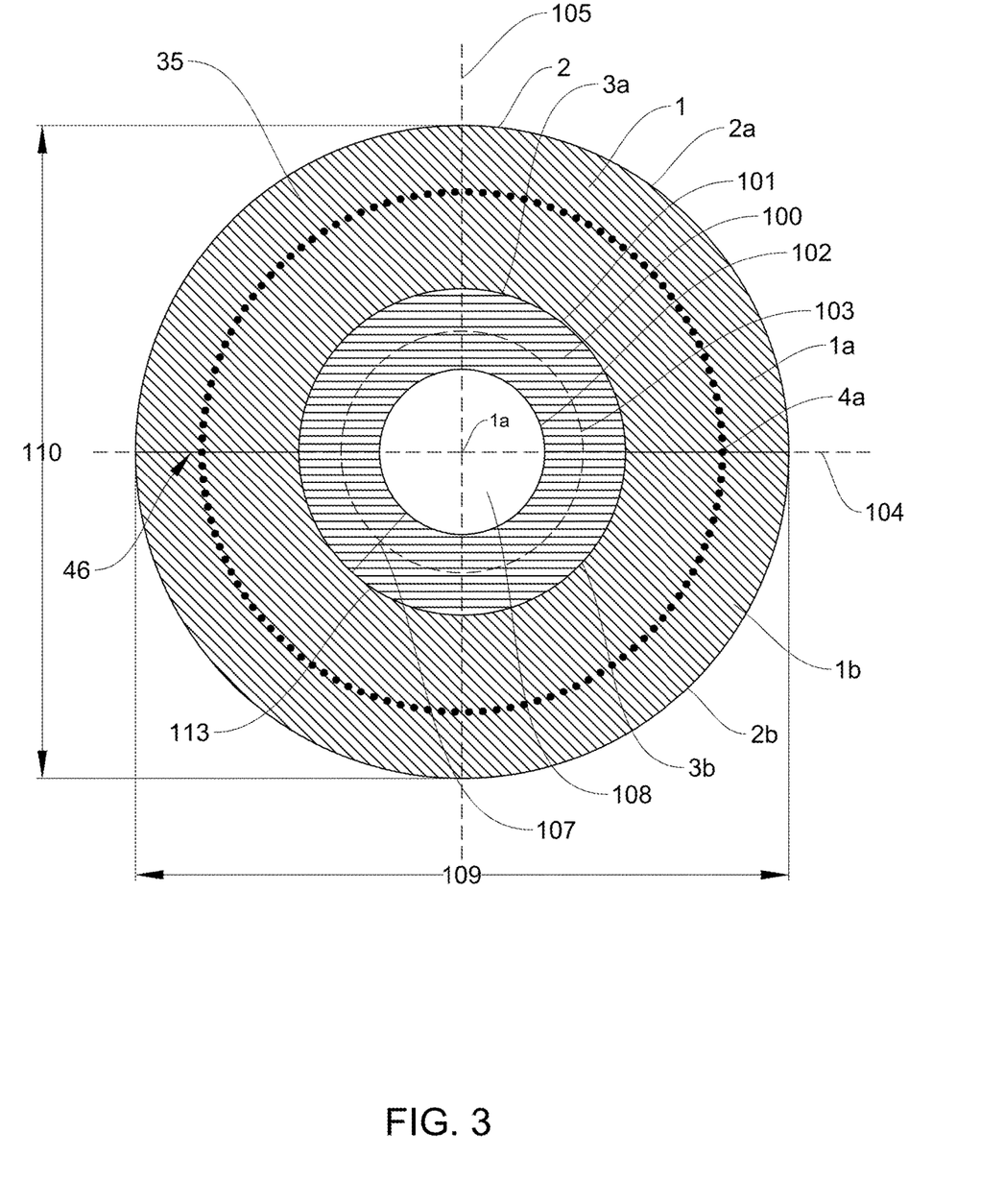
FIG. 3 provides an axial end view of the free end of the conduit of FIG. 1 as re-shaped to provide nominally circular bore.

In accordance with the preferred embodiment of the invention sliding die 1, as shown in an axial end view in FIG. 3, is provided in preferably two equivalent parts 1a and 1b, jointly referred to as die 1. Die 1 provides an outer die surface 2, in two equivalent preferably semi-cylindrical parts 2a and 2b, plus a cylindrical inner die surface 3, in two equivalent preferably semi-cylindrical parts 3a and 3b.

The two parts 1a and 1b of die 1 are adapted to mate along mating surfaces 4a and 4b to provide a cylindrical inner surface 3 adapted to provide a sliding interference fit with the outer surface 101 of first conduit 100 and render outer surface 101 toward, and preferably into, a cylindrical surface on axis 106, preferably without damage to or extrusion of the first flexible conduit.

Figure 4:
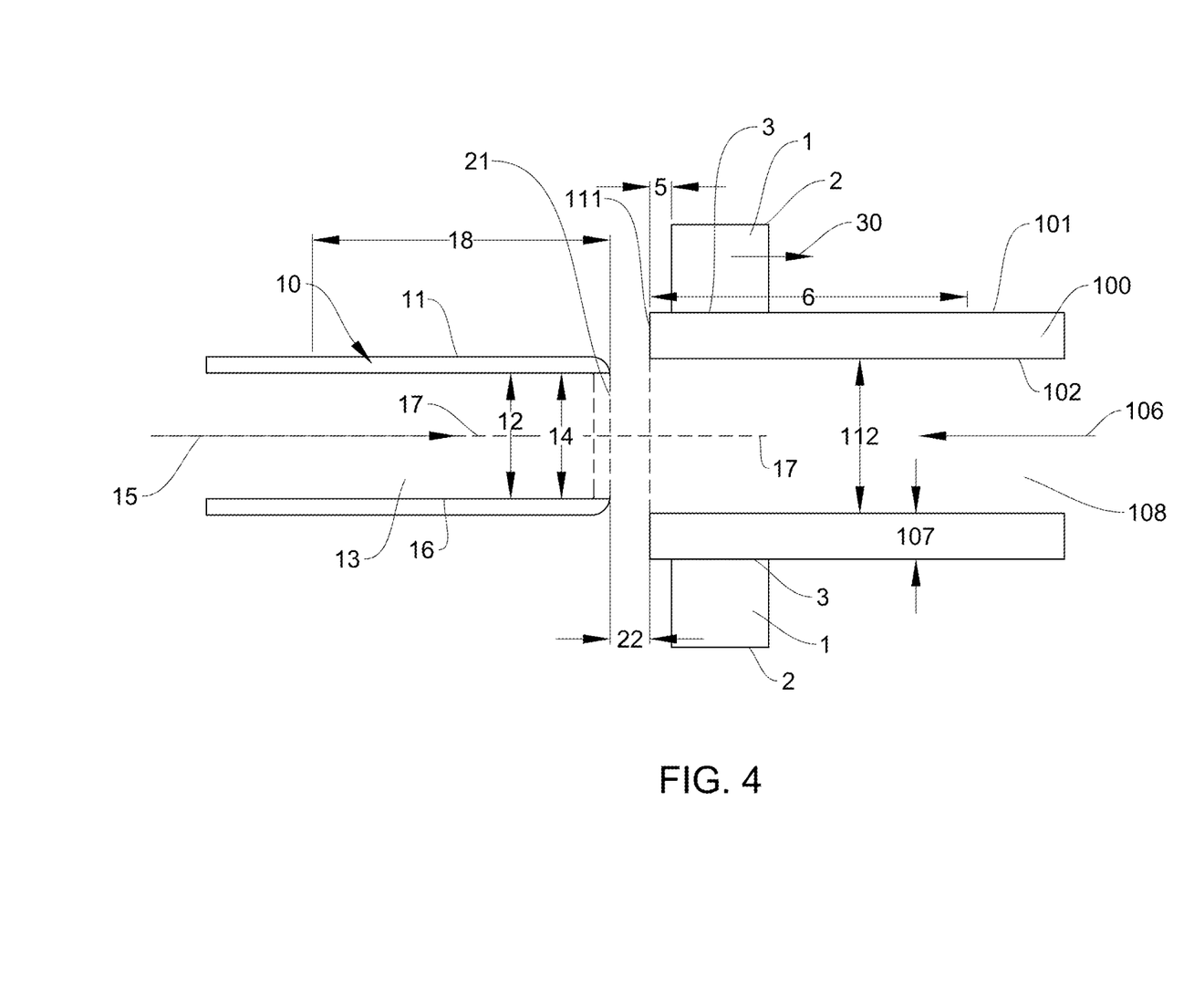
FIG. 4 provides a vertical section of the flexible conduit of FIGS. 1 and 2 axially aligned with rigid conduit and presented for pre-assembly.
Figure 5:
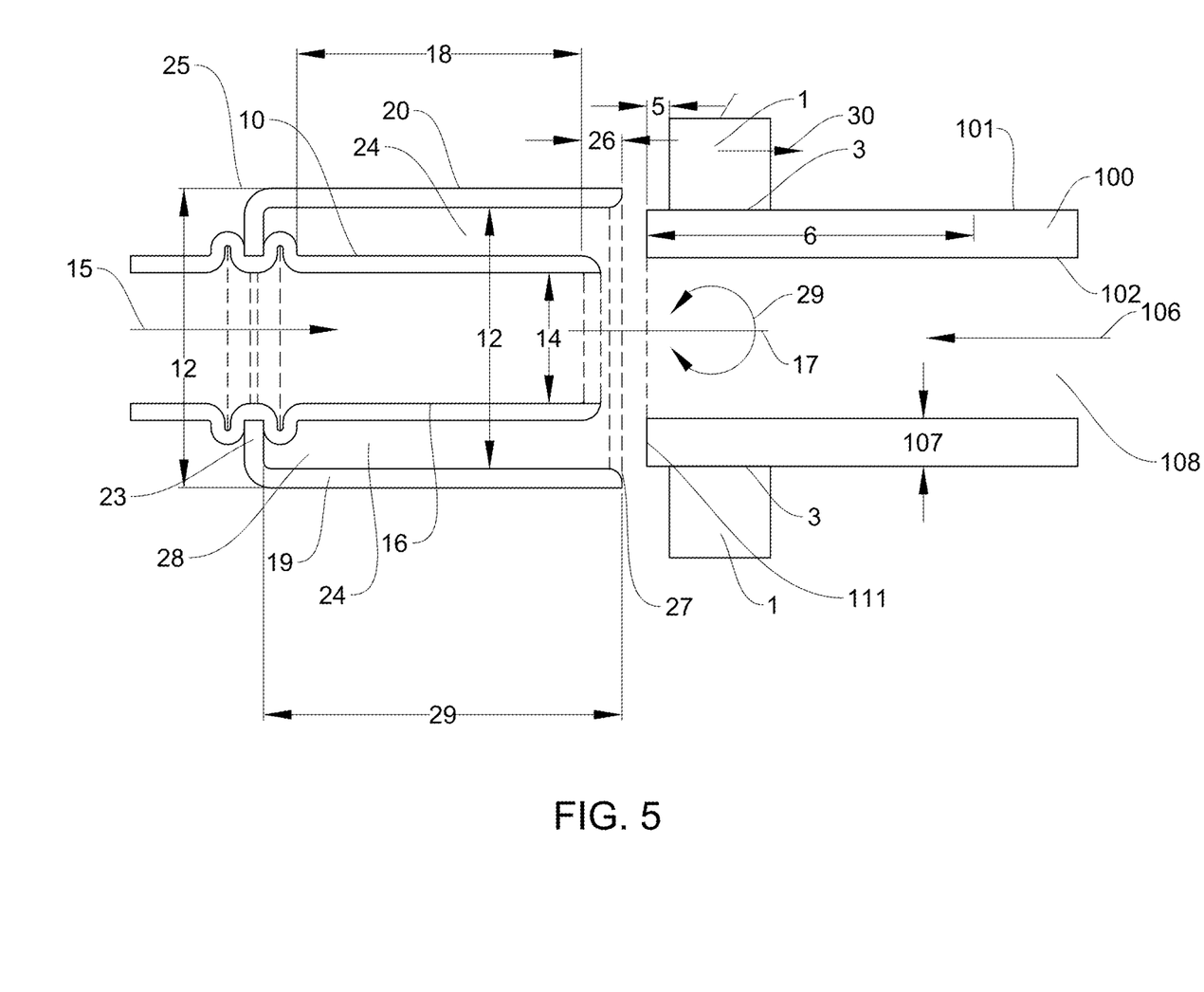
FIG. 5 provides the vertical section as shown in FIG. 4 including an encapsulating ferrule mounted to the rigid conduit.

Once assembled to the fluid conduit 100 and providing a shape conforming control as shown in FIGS. 3, 4 and 5, die 1 is spaced a setback distance 5 from the free end 111 of conduit 100. Distance 5 may be zero, positive or negative. Die 1 is adapted to slide along the conduit 100 away from the free end 111 in axial direction 30 to correspond to insertion distance 6, namely an amount of insertion distance 6 less set back distance 5.

FIG. 4 includes a vertical section through cylindrical preferably rigid conduit 10 having an outer surface 11 and a diameter 12 which corresponds to central bore diameter 112 if flexible conduit 100. Rigid conduit 10 includes a central bore 13 with an inner surface 16 and a diameter 14. Central bore 15 includes a main axis 15 which is axially aligned as at 17 with flexible conduit main axis 106 for presentment as shown in FIGS. 4 and 5 and assembly.

In FIG. 4 conduits 10 and 100 are driven together along a common axis 17 to close pre-assembly gap 22 between conduit 10 free and conduit 100 free end and slide conduit 10 outer surface into the central bore 108 of conduit 100 in a sliding interference leak-resistance fit wherein outer diameter 12 closely corresponds to inner diameter 112 and outer surface 11 closely conforms to inner surface 102 over an insertion distance 18 and 6

In FIG. 5 a cylindrical ferrule 19 is secured at an end, preferably closed, to the body of conduit 10 as at 23 in FIG. 5 a sufficient distance from free end 21 to provide an insertion cavity 24, preferably annular. Most preferably cavity 24 is closed at its connection to conduit 10.

Ferrule 19 includes it free end 27 preferably set forward of the free end 21 a distance 26 which may be zero, positive or negative.

Most preferably ferrule 19 outer surface 10 has a cylindrical shape axially aligned on insertion axis 15 with an inner surface 28 having a diameter 14 which corresponds to the outer diameter 101 of conduit 100 for a sliding interference leak-resisting fit.

Most preferably, relative rotation 29 between conduit 100 and conduit 10 around alignment axis 17 commences:
as pre-assembly gap 22 is reduced to zero and becomes, and,
conduit 100 is inserted into insertion cavity 24.

Figure 6:
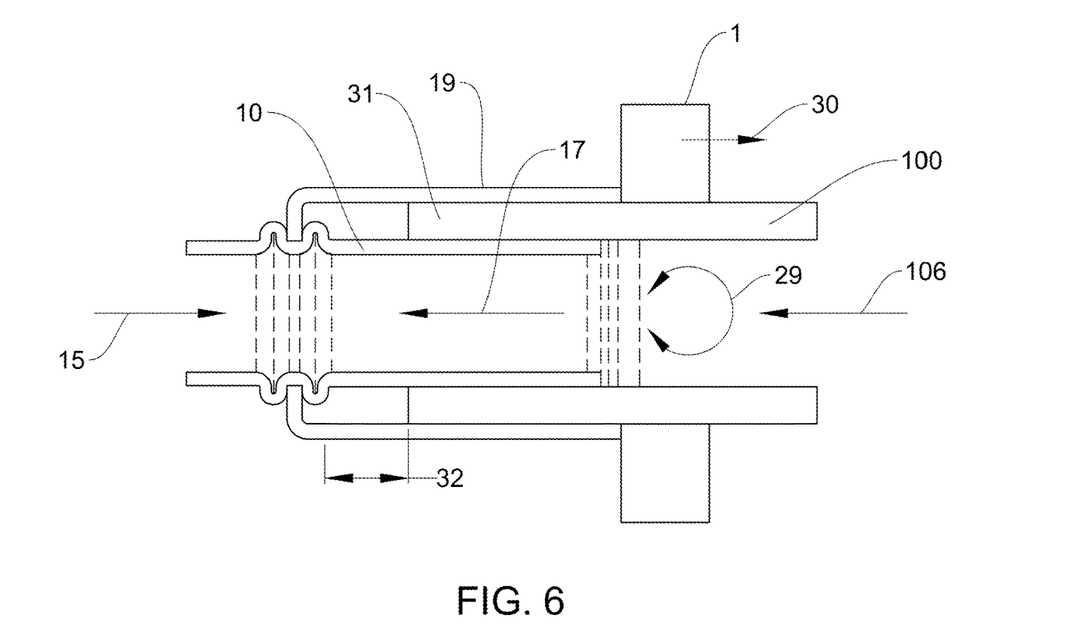
FIG. 6 provides a vertical section as shown in FIG. 5 wherein the ferrule drives the sliding die axially away from the rigid conduit.
Figure 7:
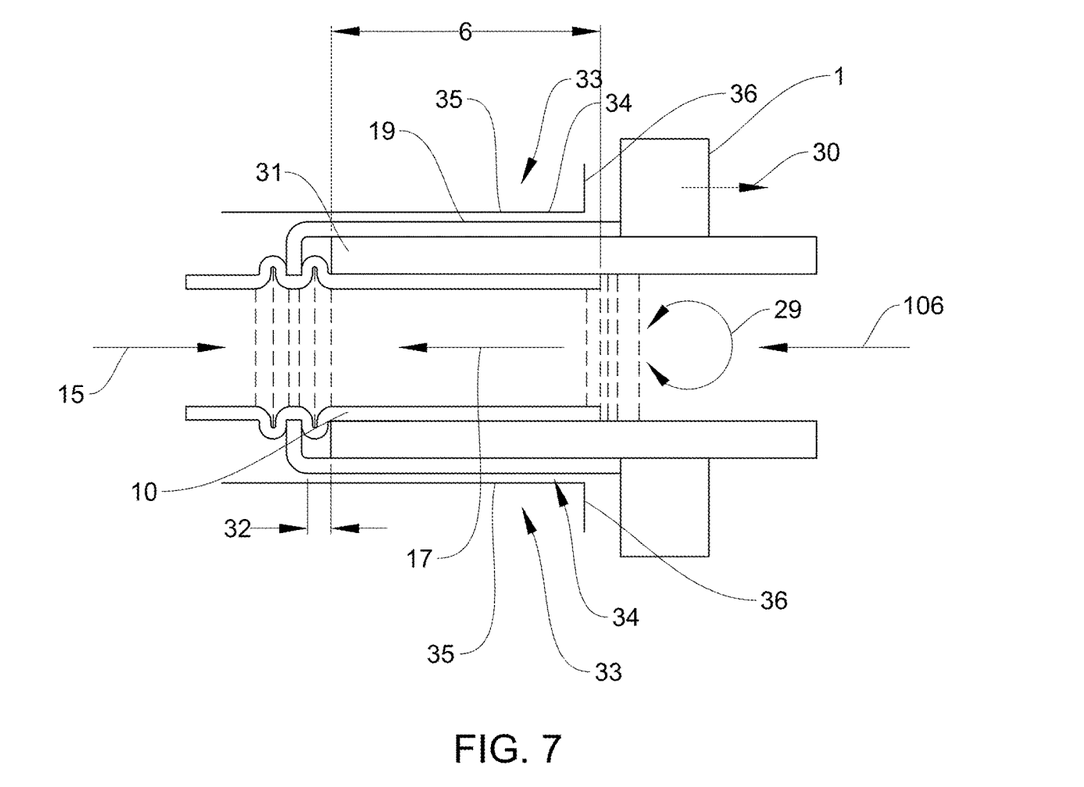
FIG. 7 provides a vertical section as shown in FIG. 6 showing a full insertion of the flexible conduit into the insertion cavity for further processing.

As insertion continues as shown in FIGS. 6 and 7 with inserted free end 31 progressing in a sliding interference fit with one or both of conduit 10 outer surface 11 and ferrule 20 inner surface 28, free end 31 closes the balance of insertion distance 32 towards and preferably to zero as shown in FIG. 7.

In the preferred embodiment shown in FIGS. 5, 6 and 7 ferrule 20 drives sliding die 2 in direction 30 away from free end 111 as insertion continues to its conclusion as shown in FIG. 7.

Figure 8:
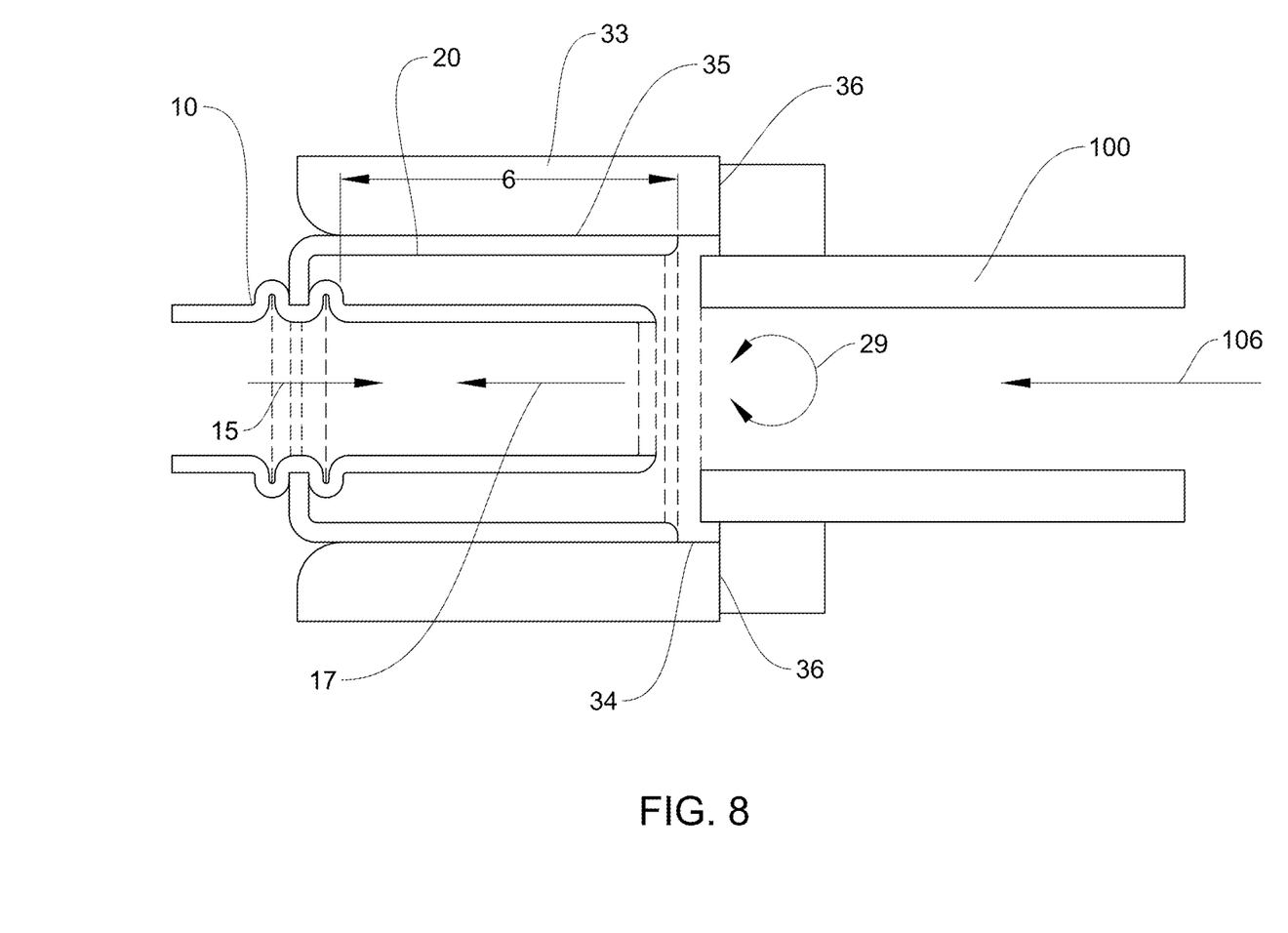
FIG. 8 provides a vertical section as shown in FIG. 5 in an alternative embodiment.

In a preferred embodiment, ferrule 20 is loosely confined within an alignment cavity 34 by an alignment block 33 which provides a sliding inner alignment surface 35. Block 33 may provide a driving surface 36 which contacts sliding die 1 and causes die 1 to slide during insertion as shown in FIG. 8.

The following list of elements is included in the description.

Although some embodiments have been described herein, it should be understood that these embodiments are provided for illustration only and are not to be construed in any way as limiting the present invention, and that various modifications, changes, and alterations can be made by those skilled in the art without departing from the spirit and scope of the invention.

LIST OF ELEMENTS 100 flexible first fluid conduit
110 one dimension
104 central plane
109 other dimension
105 another plane
101 outer surface
102 central inner surface
106 central axis
103 pressure resistant braid
107 nominal wall thickness
111 flexible conduit free end
108 central bore
109 curved central axis
112 bore diameter
113 interference fit
1 female sliding die
1a die part
1b die part
2 outer die surface
2a part die outer surface
2b part die outer surface
3 inner die surface
3a part inner die surface
3b part inner die surface
4a and 4b mating surfaces
5 set back distance
6 insertion distance
10 rigid second conduit
11 outer surface
12 outer surface diameter
13 central bore
14 bore diameter
15 rigid conduit main axis
16 rigid conduit inner surface
17 pre-assembly alignment axis
18 insertion distance
19 ferrule
20 outer surface
21 free end
22 pre-assembly gap
23 ferrule secured
24 insertion cavity
25 cavity closed
26 set forward distance
27 free end
28 ferrule inner surface
29 relative rotation
30 sliding die axial direction
31 inserted free end
32 balance of insertion distance
33 alignment block
34 alignment cavity
35 sliding alignment surface
36 driving surface

The invention claimed is:

1. A tooling system for automated co-axial assembly comprising:
 (a) a first cylindrical flexible fluid conduit having:
  i. a first inline fluid-transfer nominally cylindrical bore with a corresponding central first fluid conduit axis,
  ii. a nominally cylindrical first outer surface, and,
  iii. a first free end,
 (b) a second cylindrical fluid conduit having:
  i. a second inline fluid-transfer bore with a corresponding central second fluid conduit axis, and,
  ii. a nominally cylindrical second outer surface, and
  iii. a free end, wherein the second outer surface including a nominal diameter adapted to engage circumferentially with the first inline fluid-transfer bore,
 (c) in an overlapping fluid-leak-resisting relationship between the first fluid transfer bore and the second outer surface,
 (d) a female die component adapted, when engaged with the outer surface of the first fluid conduit during the assembly process:
  i. to confine the shape of the outer surface of the first free end within its nominally cylindrical shape, and,
  ii. to confine the first fluid conduit axis at the first free end to the center of its nominally cylindrical shape and its bore along a substantially straight line, and,
  iii. to provide a sliding interference fit between the female die component and the first outer surface,
 and
 (e) a guiding mechanism adapted, when engaging with and guiding either or both of the first and the second fluid conduits:
  i. to confine the first and second fluid conduit axes to axial end-to-end alignment with each other,
  ii. to axially present the free end of the fluid conduits to each other,
 and,
 (f) a pressing mechanism adapted both:
  i. to drive the second outer fluid conduit surface into the first fluid transfer bore,
 and,
  ii. to simultaneously drive the female die component away from the first free end along the first fluid conduit axis.

2. A tooling system as claimed in claim 1 wherein the pressing mechanism simultaneously drives the second outer fluid conduit surface within the first fluid transfer bore, and, the female die component away from the first free end along the first fluid conduit axis.

3. A tooling system as claimed in claim 1, wherein the female die component engages the first outer surface spaced from the first free end.

4. A tooling system as claimed in claim 3, wherein the pressing mechanism drives the first and second fluid conduits into free-end-to-free-end contact and subsequently drives the female die component.

5. A tooling system as claimed in claim 1, wherein the pressing mechanism drives the female die component prior to and following upon free-end-to-free-end contact.

6. A tooling system as claimed in claim 1 wherein the second fluid conduit includes an open cylindrical ferrule:
 i. secured in relation to the second fluid conduit distal from the its free end,
 ii. having an internal diameter larger than the nominal diameter of the second outer surface, and,
 iii. adapted to sealingly engage the first outer surface.

7. A tooling system as claimed in claim 6, wherein the pressing mechanism includes the ferrule which drives the female die component.

8. A tooling system as claimed in claim 1, wherein the pressing mechanism simultaneously drives the second outer fluid conduit surface within the first fluid transfer bore axially with a component of co-rotation about that axis between the first and second fluid conduits.

9. A process for automated co-axial assembly comprising:
providing (a) a first cylindrical flexible fluid conduit having:
  i. a first inline fluid-transfer nominally cylindrical bore with a corresponding central first fluid conduit axis,
  ii. a nominally cylindrical first outer surface, and,
  iii. a first free end,
providing (b) a second cylindrical fluid conduit having:
  i. a second inline fluid-transfer bore with a corresponding central second fluid conduit axis, and,
  ii. a nominally cylindrical second outer surface, and
  iii. a free end, wherein the second outer surface including a nominal diameter adapted to engage circumferentially with the first inline fluid-transfer bore,
providing (c) in an overlapping fluid-leak-resisting relationship between the first fluid transfer bore and the second outer surface,
including:
  (d) engaging the outer surface of the first fluid conduit before and during the assembly process with a female die component:
    i. to confine the shape of the outer surface of the first free end within its nominally cylindrical shape, and,
    ii. confining the first fluid conduit axis at the first free end to the center of its nominally cylindrical shape and its bore along a substantially straight line, and,
    iii. providing a sliding interference fit between the female die component and the first outer surface,
and
  (e) guiding and engaging either or both of the first and the second fluid conduits:
    i. to confine the first and second fluid conduit axes to axial end-to-end alignment with each other,
    ii. to axially present the free end of the fluid conduits to each other,
and,
  (f) pressing both:
    i. the second outer fluid conduit surface into the first fluid transfer bore, and,
    ii. simultaneously driving the female die component away from the first free end along the first fluid conduit axis.

10. The process as claimed in claim 9 wherein the pressing simultaneously drives the second outer fluid conduit surface within the first fluid transfer bore, and, the female die component away from the first free end along the first fluid conduit axis.

11. The process as claimed in claim 9, wherein the female die component engages the first outer surface spaced from the first free end.

12. The process as claimed in claim 11, wherein the pressing drives the first and second fluid conduits into free-end-to-free-end contact and subsequently drives the female die component.

13. The process as claimed in claim 12, wherein the pressing drives the female die component prior to and following upon free-end-to-free-end contact.

14. The process as claimed in claim 9, wherein the second fluid conduit includes an open cylindrical ferrule:
  i. secured in relation to the second fluid conduit distal from the its free end,
  ii. having an internal diameter larger than the nominal diameter of the second outer surface, and,
  iii. adapted to engage the first outer surface.

15. The process as claimed in claim 14 wherein the open cylindrical ferrule sealingly engages the first outer surface.

16. The process as claimed in claim 9, wherein the guiding confines either the second outer surface or the ferrule to a nominal cylindrical shape when engaging with and guiding the second fluid conduit.

17. The process as claimed in claim 9, wherein one or both of the second fluid conduit and the ferrule are rigid.

18. The process as claimed in claim 9, wherein the pressing simultaneously drives the second outer fluid conduit surface within the first fluid transfer bore axially with a component of co-rotation about that axis between the first and second fluid conduits.

19. The process as claimed in claim 18, wherein the first fluid conduit is secured horizontally and the pressing mechanism drives the second fluid conduit and the ferrule horizontally with a co-rotational component about the axis.

20. The process as claimed in claim 19, wherein the pressing mechanism drives the female die component.

21. The process as claimed in claim 20, wherein the female die component includes the guiding mechanism.

* * * * *